US009214782B2

(12) United States Patent  
Solgaard et al.

(10) Patent No.: US 9,214,782 B2
(45) Date of Patent: Dec. 15, 2015

(54) DIELECTRIC LASER ELECTRON ACCELERATORS

(71) Applicant: The Board of Trustees of the Leland Stanford Junior University, Palo Alto, CA (US)

(72) Inventors: Olav Solgaard, Stanford, CA (US); Chia Ming Chang, Eatontown, NJ (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 230 days.

(21) Appl. No.: 14/024,548

(22) Filed: Sep. 11, 2013

(65) Prior Publication Data

US 2014/0070732 A1   Mar. 13, 2014

Related U.S. Application Data

(60) Provisional application No. 61/699,398, filed on Sep. 11, 2012.

(51) Int. Cl.
| H01J 23/00 | (2006.01) |
| H01S 3/09 | (2006.01) |
| H05H 7/04 | (2006.01) |
| H05H 15/00 | (2006.01) |

(52) U.S. Cl.
CPC ............... *H01S 3/0903* (2013.01); *H05H 7/04* (2013.01); *H05H 15/00* (2013.01); *H05H 2007/041* (2013.01)

(58) Field of Classification Search
USPC .................................................. 315/500–505
See application file for complete search history.

(56) References Cited

U.S. PATENT DOCUMENTS

| 7,421,158 | B2* | 9/2008 | Fainman | G02B 5/1857 385/31 |
| 7,626,179 | B2* | 12/2009 | Gorrell | H01L 21/32136 250/396 R |
| 7,994,472 | B2* | 8/2011 | Plettner | H05H 7/06 250/251 |
| 8,600,200 | B1* | 12/2013 | Rakich | G02F 1/0126 385/1 |
| 8,604,440 | B2* | 12/2013 | Frisch | G01T 1/208 250/367 |
| 8,624,528 | B2* | 1/2014 | Balakin | A61N 5/10 250/396 R |
| 8,669,513 | B2* | 3/2014 | Hughes | G01T 1/2018 250/216 |
| 2003/0023417 | A1* | 1/2003 | Chen | H01P 1/2005 703/3 |
| 2005/0153464 | A1* | 7/2005 | Fainman | G02B 5/1857 438/9 |
| 2006/0050753 | A1* | 3/2006 | Ogura | B82Y 10/00 372/43.01 |
| 2007/0081165 | A1* | 4/2007 | Kilic | G01H 9/00 356/477 |
| 2007/0170370 | A1* | 7/2007 | Gorrell | H01J 25/34 250/396 R |
| 2008/0226217 | A1* | 9/2008 | Kilic | G02B 6/264 385/12 |
| 2009/0097811 | A1* | 4/2009 | Hadzialic | B82Y 20/00 385/131 |
| 2010/0065724 | A1* | 3/2010 | Hughes | G01T 1/2018 250/216 |
| 2010/0094266 | A1* | 4/2010 | Travish | H01J 35/14 606/15 |
| 2010/0320391 | A1* | 12/2010 | Antonuk | H01L 27/1462 250/366 |
| 2011/0220802 | A1* | 9/2011 | Frisch | G01T 1/208 250/363.03 |
| 2012/0002913 | A1* | 1/2012 | Grepstad | B82Y 20/00 385/12 |
| 2012/0045165 | A1* | 2/2012 | Carralero | G01D 5/268 385/13 |

(Continued)

*Primary Examiner* — Tung X Le
*Assistant Examiner* — Srinivas Sathiraju
(74) *Attorney, Agent, or Firm* — Lumen Patent Firm

(57) ABSTRACT

A laser-driven dielectric electron accelerator is composed of a dielectric photonic crystal accelerator structure having an electron beam channel and buried grating whose elements are arranged linearly parallel to the electron beam channel. The accelerator structure preferably has a thin film material coating. The grating may have an asymmetric structure. The accelerator and undulator structures may be integrated with on-chip optical and electronic devices such as waveguide devices and control circuits so that multiple devices can be fabricated on the same chip.

13 Claims, 3 Drawing Sheets

(56) References Cited

U.S. PATENT DOCUMENTS

2012/0113637 A1* 5/2012 Solgaard .............. G02B 3/0087
362/235

2014/0183369 A1* 7/2014 Frisch .................... G01T 1/208
250/366

2015/0098544 A1* 4/2015 Blanovsky ............... G21C 1/28
376/246

* cited by examiner

DIELECTRIC LASER ELECTRON ACCELERATORS

CROSS-REFERENCE TO RELATED APPLICATIONS

This application claims priority from U.S. Provisional Patent Application 61/699,398 filed Sep. 11, 2012, which is incorporated herein by reference.

STATEMENT OF GOVERNMENT SPONSORED SUPPORT

This invention was made with Government support under contract N66001-11-1-4199 awarded by Space and Naval Warfare Systems Command. The Government has certain rights in this invention.

FIELD OF THE INVENTION

This invention relates generally to improved dielectric laser electron accelerators.

BACKGROUND OF THE INVENTION

Traditional RF electron accelerators are bulky. The transverse size of the RF electron accelerator is about four orders of magnitude larger than that of the optical electron accelerator. Traditional RF electron accelerators are also limited by smaller accelerator gradient (~30 MV/m), compared to the optical electron accelerators (>1 GV/m). As a result, the accelerator length of the traditional RF electron accelerator is about one order longer than that of the optical electron accelerator. These physical limitations increase the difficulty of shrinking RF electron accelerators to tabletop sizes for portable applications.

Some optical electron accelerators use guided wave structures, which require accurate phase velocity matching between the laser pulses and the electron beams because the accelerating laser pulses are co-propagating with the electron beams. This increases difficulties in structure design (to match the phase velocity), coupler design (to couple light into structure efficiently) and integration between accelerators and other components.

As example of the current state of the art, a dielectric laser accelerator is described in U.S. Pat. No. 7,994,472 to Tomas Plettner and Robert L. Byer, "Laser-driven deflection arrangements and methods involving charged particle beams", issued 9 Aug., 2011, which is incorporated herein by reference.

SUMMARY OF THE INVENTION

The present invention provides, in one aspect, high-performance, compact and cost-effective integrated accelerator structures for tunable electron beam based light sources. Advantageously, embodiments of the present invention use structures such that the laser pulses are orthogonal to the electron beams, so phase velocity matching is less of a concern. In embodiments of the invention, accelerator structures are designed based on buried gratings and photonic crystals. Asymmetric structures and random structures may be used to optimize the accelerating fields. The performance of the devices may be improved using a material coating and hydrogen annealing.

In one aspect, the invention provides a laser-driven dielectric electron accelerator comprising a dielectric photonic crystal accelerator structure having an electron beam channel and buried grating. The accelerator structure is preferably composed of silicon, silicon dioxide, silicon nitride, or silicon carbide. The buried grating is composed of elements arranged linearly parallel to the electron beam channel. The buried grating may have a periodic structure, or an asymmetric or random structure. The buried grating preferably has elements with linear dimensions between $0.5\lambda$ and $\lambda$, where $\lambda$ is an operational wavelength of incident laser light. The buried grating is preferably positioned at a distance between $0.1\lambda$ and $\lambda$ from the electron beam channel. The electron beam channel may have smooth and continuous sidewalls or textured sidewalls. The electron beam channel preferably has a width between $0.05\lambda$ and $2\lambda$ and a depth between $0.05\lambda$ and $500\ \mu m$. The accelerator may include a thin film material coating having an index of refraction between 1 and 2, for example, silicon dioxide, alumina or silicon nitride. The accelerator may also include a combination of multiple distinct thin film material coatings.

These accelerator structures can be fabricated using CMOS and MEMS compatible materials and processes, thus leveraging the well-developed CMOS and MEMS industry at low cost. Furthermore, the CMOS and MEMS compatible processes allow the structures and components to be integrated on a chip, which makes the devices well suited for portable light sources.

The accelerator structures may be integrated with electron sources, integrated optical waveguides and undulator structures. According to an embodiment of the invention, an integrated electron beam based light source includes an integrated electron source, accelerator structures, integrated optical devices and undulator structures. Electron beams from the electron source propagate into the accelerator structures, in which the electron beams are accelerated by high power laser pulses guided by the integrated optical devices or by free space optics. The accelerated electron beams then propagate into the undulator structure, generating lasers ranged from THz to X-ray. The accelerator and undulator structures may be integrated with on-chip optical and electronic devices such as waveguide devices and control circuits so that multiple devices can be fabricated on the same chip. Implementation of integrated electron sources may be based on the principles of thermionic emission, field emission and photoemission. These electron sources can be fabricated using metal or dielectric materials.

The design of accelerator and undulator structures may be suited for different applications. Embodiments may include gratings, 1D, 2D and 3D photonic crystals, asymmetric structures and random structures. The fabrication of accelerator and undulator structures may use different materials such as silicon, silicon dioxide, silicon nitride, silicon carbide, and ALD materials. The fabrication of accelerator and undulator structures may use different processes such as ALD coating and hydrogen annealing.

A compact laser-driven dielectric electron accelerator according to embodiments of the present invention may be use to implement tunable electron based light sources. The device provides improved accelerator performance with simple fabrication process, thus is well-suited for various applications. For example, this device can be used as a light source for oil well jogging, especially used as a miniaturized version of the live fluid analyzer. This device can also be used in medical applications such as medical diagnostics, radiation therapy for cancer, and medical imaging. Other applications include mass spectrometry, ion implantation, and X-ray microlithography.

DETAILED DESCRIPTION

Figure 1A:
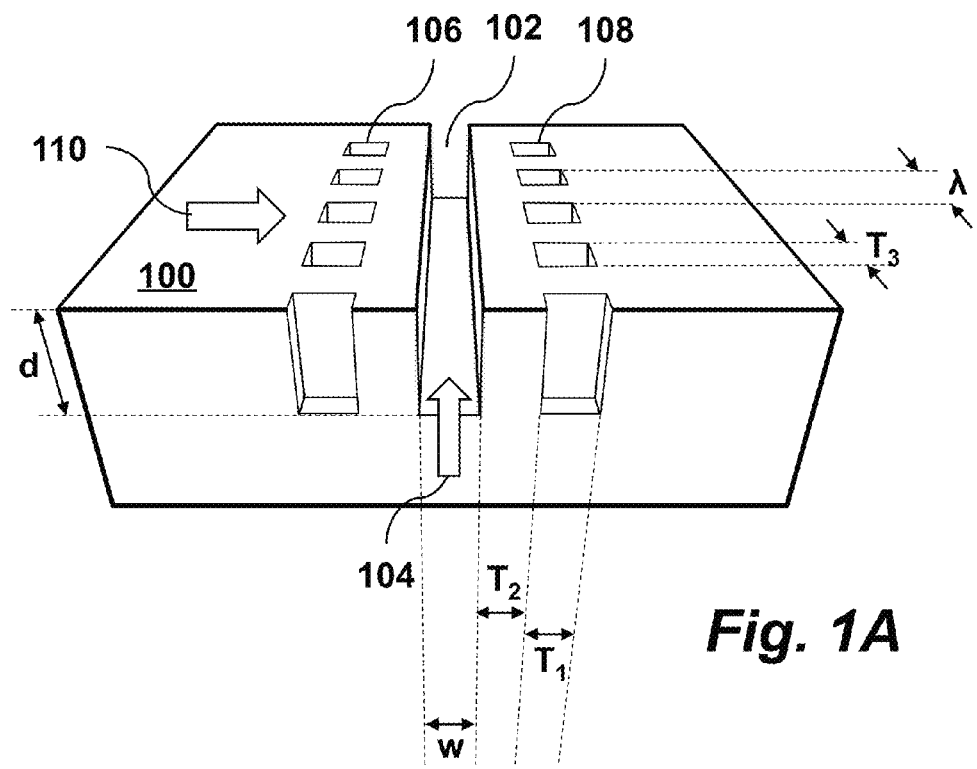
FIG. 1A is a schematic of a silicon dielectric laser electron accelerator structure according to an embodiment of the invention.

Laser-driven dielectric electron accelerators have been studied since first being proposed in 1962. The use of high power lasers and dielectric materials has the potential to increase the accelerating gradients to GV/m, enabling miniaturization of accelerators for ultra-compact portable light sources. However, laser-driven, miniaturized accelerators have not yet been realized due to the lack of practical accelerator designs and manufacturing processes. With recent advances in ultrashort pulse lasers and semiconductor technology, however, electron accelerators with chip-scale dimensions have become possible. This has heightened the need for accelerator designs that can efficiently transfer laser energy to electron energy.

Prior designs have included guided structures, such as photonic crystal holey fibers, and optical Bragg structures. In these structures, the electron beam is co-propagating with the laser beam so that the electron beam can be accelerated by the longitudinal electric fields of the guided optical wave. However, the energy-transfer efficiencies of these guided structures are limited by phase velocity mismatch and practical difficulties in excitation of the desired waveguide mode for acceleration. To address phase velocity mismatch, researchers have proposed grating accelerators, in which the optical field is incident normal to the electron channel and linearly polarized along the channel. The grating structure provides a periodic π radian phase reversal of the optical beam, such that an electron moving through one grating period in one optical cycle always experiences an accelerating field if timed correctly. A sufficiently short electron packet will then be accelerated by the optical field as it passes through the channel, provided that it arrives in the first section of the first grating period during the part of the optical cycle when the electrical field is aligned with the electron motion. This accelerator design removes the phase matching condition and replaces it with two timing conditions: The electron packet must 1) arrive in the grating at the right time and 2) pass through one grating period in one optical cycle. The second criterion is particularly simple to achieve for relativistic electrons, because the grating period does not have to be adjusted as the electron gains energy.

Quartz grating accelerators have been reported with maximum simulated accelerating gradient ($G_0$) of $0.5E_0$, in which $G_0$ can be defined as average electric field that an electron experiences in one grating period in units of input electric field ($E_0$).

$$G_0 = 1/\lambda \int_0^\lambda E[x(t),t]dx \quad (1)$$

where λ is the wavelength of the input laser beam, E[x(t),t] is the longitudinal electric field along the channel center and x(t) is the position of the electron at time t. It follows from Eq. (1) that increasing the electric field amplitude in the channel leads to large accelerating gradients.

The present invention advances the state of the art by providing a buried-grating accelerator that substantially boosts the accelerating gradient to about $1.2E_0$. Compared to the reported quartz grating accelerators, the buried grating accelerator, shown schematically in FIG. 1, provides an extra degree of freedom in the grating design, the slab width ($T_2$), that leads to larger accelerating fields when optimized by creating a Fabry-Perot cavity between the two buried gratings. In addition, its simple fabrication process using standard silicon wafers and processing technology makes it practical to conformally apply thin film coatings that can further improve accelerating efficiency. Furthermore, the buried grating separates the electron channel from the grating structure so that the propagating electrons experience smooth sidewalls, thereby reducing the scattering loss of the electron beam.

In one embodiment, a silicon accelerator design is based on a buried grating structure that enables flexible phase synchronization, large electric field amplitude along the electron channel, and low standing-wave ratio in the material. The silicon buried gratings can increase the accelerating gradients to more than double those of reported quartz grating accelerators; consequently, these silicon buried gratings only require 40% of the input laser fluence to achieve the same accelerating gradient. With a 100 fs pulse laser, these silicon buried gratings can achieve a maximum gradient of 1.1 GV/m, indicating that the buried-grating accelerators have potential for numerous electron-accelerator applications. FIG. 1A is a schematic of an accelerator structure according to an embodiment of the invention. A silicon structure 100 has a channel 102 through which an electron beam 104 travels during operation. On both sides of the channel 102 are grating structures 106 and 108, which are buried in the sense that they are fabricated behind the walls of the channel 102. During operation, laser beam pulses 110 at operational wavelength λ are incident from the side, ideally perpendicular to the beam channel 100 and gratings 106 and 108, and interact with the buried grating structures 106 and 108 to produce in the channel 102 acceleration of electrons of the electron beam 104.

The laser-driven dielectric electron accelerator 100 is composed of a dielectric photonic crystal, e.g., silicon, silicon dioxide, silicon nitride, or silicon carbide. The buried grating is composed of elements arranged in two lines parallel to the electron beam channel 102 on both sides. The buried grating may have a periodic structure, as shown in FIG. 1, or an asymmetric or random structure. The buried grating 106, 108 preferably has elements with linear dimensions $T_1$ by $T_3$ positioned at a distance $T_2$ from the electron beam channel 102. The value of $T_1$ preferably ranges between 0.5λ and λ, $T_3$ ranges between 0.3λ and 0.7λ, and $T_2$ between 0.1λ and λ. Preferably, the grating elements are arranged along the longitudinal direction with period equal to λ. The electron beam channel 102 may have smooth and continuous sidewalls or textured sidewalls. The electron beam channel 102 preferably has a width w between 0.05λ and 2λ and a depth d between 0.05λ and 500 μm. In some embodiments, the accelerator may include a thin film material coating having an index of refraction between 1 and 2, for example, silicon dioxide, alumina or silicon nitride. The accelerator may also include a combination of multiple distinct thin film material coatings.

The electron beam channel 102 may have smooth and continuous sidewalls or textured sidewalls. The sidewalls are preferably designed based on two considerations: to minimize the scattering loss and to maintain the phase matching condition. A smooth sidewall can minimize the scattering loss of both electron beams and laser beams and maintain the phase matching condition. A textured sidewall such as periodic structures may also reduce losses. Smooth and textured sidewalls could be fabricated by the CMOS/MEMS technologies, such as photolithography, etching and annealing techniques.

The gradient elements 108 may be arranged to be periodic or asymmetric. Since large accelerating gradient depends on the field reflectivity in the channel, the asymmetric structures and periodic structures are preferably designed such that the field reflectivity is higher than the symmetric cases, leading to strong Fabry-Perot resonance and large accelerating gradient. An asymmetric structure can be optimized by making the second mirror have very high reflectivity (ideally close to 100%) to maximize the fields in the accelerator. The first mirror must have a reflectivity less 100% to allow the fields to penetrate into the accelerator and set up the standing fields.

Figure 1B:
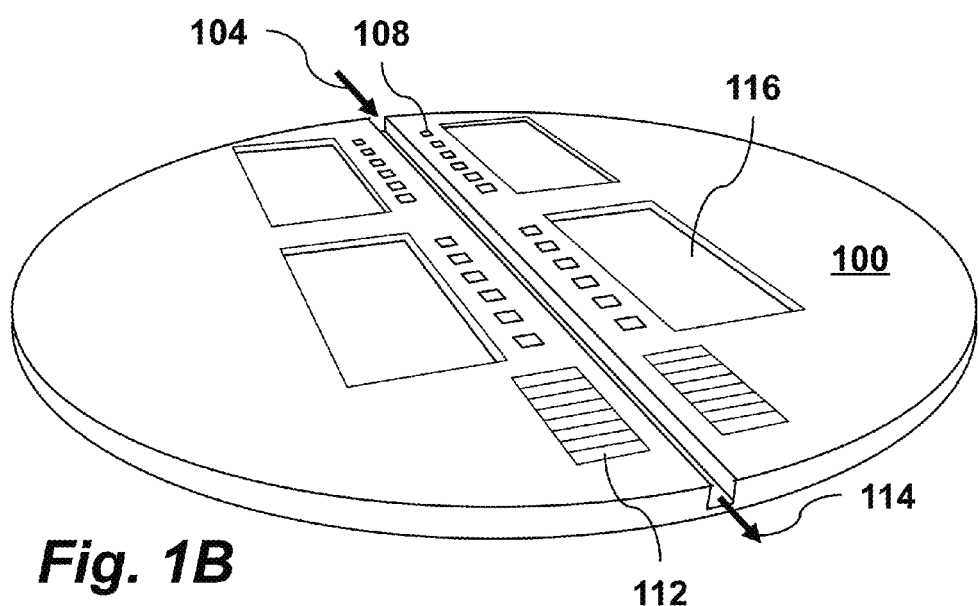
FIG. 1B is a schematic of an integrated electron beam based light source including accelerator structures and undulator structures according to an embodiment of the invention.

FIG. 1B shows the device fabricated on a silicon chip 100 including accelerator structures 116 and undulator structures 112. An electron beam 104 enters the channel during operation, is accelerated through interaction with grating elements 108. The undulator structures 112 are positioned downstream from the grating structure. The undulator 112 is in-line with the accelerator and made with a similar processing technology. Waveguides, circuitry, and MEMS may be made on the same wafers, but in different technologies. CMOS, MEMS and other fabrication technologies may be used to integrate accelerators with waveguides, undulators and electron sources, similar to IC industry.

During operation, the electron beam 104 originates from an electron source and travels through the linear accelerators and is accelerated to almost speed of light. Then the electron beam travels through a undulator that can generate magnetic field. This magnetic field forces the electron to follow a sinusoidal path, and then the electron beam radiates photons coherently to form a laser generating X-ray or THz radiation 114 which exits the channel.

Embodiments of the present invention are designed according to the following principles. Based on the input laser fluence, the operation of grating accelerators can be divided into two regions. In the laser power-limited region where the maximum electric field in the material is much lower than the material damage threshold, we only need to optimize the accelerating gradient in structural design. Alternatively, in the material damage-limited region where the laser fluence is close to or exceeds the material damage threshold, it is necessary to consider maximum electric field in the material for the structural design. The ratio of accelerating gradient ($G_0$) to the maximum electric field ($E_{max}$) therefore defines the accelerating factor ($AF=G_0/E_{max}$) used in this region.

In the laser power-limited region where the design objective is to maximize the accelerating gradient, the buried grating accelerators should be designed to have the correct phase of the electric fields in the channel, and to optimize the amplitude and distribution of the electric fields in the channel. The phase of the electric fields should have a periodic $\pi$ phase difference along the electron channel to compensate for the time reversal of the fields, giving the electron beam uniaxial acceleration. This $\pi$ phase difference comes from the grating, in which the phase difference ($\Delta\phi$) can be derived from the optical path length difference.

$$\Delta\phi=\pi=2\pi/\lambda(n-1)T_1 => T_1=\lambda/2(n-1) \qquad (2)$$

where n is the index of refraction of the grating material, and $T_1$ is the length of the grating pillar (see FIG. 1). Considering a silicon grating (n=3.45), the minimum pillar length for $\pi$ phase difference is about $0.2\lambda$.

To optimize the electric fields in the electron channel, we model the slabs (width $T_2$) and the electron channel as a Fabry-Perot cavity. At resonance, the circulating fields interfere constructively in the electron channel, thus creating large electric fields with respect to the incident electric fields. The amplitude of the electric field in the channel depends on the field reflectivity of the cavity, which is a function of the refractive index. At resonance, the electric field amplitude at the channel center is proportional to the refractive index; therefore, the maximum channel field of silicon gratings is more than twice that of quartz gratings (n=1.55).

The electric field distribution along the channel is another important factor in generating a large accelerating gradient. Due to diffraction and interference by the grating, the electric fields are amplitude-modulated along the electron channel. The period of this modulation is found to be about $\lambda/2$ with a strong electric field concentrated at the center of the unit cell and a weak electric field at the edge. Since the accelerating gradient comes from the average electric field the electron experiences in one period, increasing the electric fields at the edge of the unit cell would increase the accelerating gradient, which can be designed by changing the duty cycle of the gratings.

In the material-damage region, our design objective is to maximize the accelerating factor. In addition to the considerations in phase and amplitude of the electric fields in the channel, the buried grating should be designed to have the smallest possible electric fields in the material away from the electron channel. This determines the maximum laser field that can be applied without damaging the material. The maximum electric field in the material depends mainly on the reflected waves from the structure. These reflected waves superimpose with the incident waves, creating standing waves where the maximum field is larger than the incident field. These standing waves limit the incident electric field required to reach the material damage threshold, thus limiting the maximum accelerating factor.

When a speed-of-light electron travels through the channel in phase with the optical pulses, the electron experiences the highest possible accelerating fields in one optical cycle, leading to a maximum accelerating gradient. In contrast, an electron out of phase by a half-cycle experiences maximum decelerating gradient.

The phase distribution of the electric fields in the grating provides $\pi$ phase difference every half period along the electron channel, thus enabling the compensation of electric field time reversal. As an example, a device with $T_1=0.2\lambda$, $T_2=0.15\lambda$ and w=$0.6\lambda$ has a maximum accelerating gradient ($G_0$) of $0.79E_0$ and a maximum electric field in silicon of $2.72E_0$, leading to a maximum accelerating factor of 0.29 that the structure can sustain.

To further increase the accelerating gradient and accelerating factor, in some embodiments one or more thin film coatings may be added to the buried grating accelerators. The presence of these thin film coatings offers two advantages. First, it can adjust the duty cycle of the gratings, thus improving the electric fields at the edge of the unit cell for optimal accelerating gradient. Second, since the tradeoffs between the fields in the channel and the maximum field in the material depend on reflectivity, the thin film can control the reflectivity to optimize the accelerating factor.

For example, in a device with $T_1=0.6\lambda$, $T_2=0.4\lambda$, gap=$0.5\lambda$ and an oxide coating (n=1.55) of $0.095\lambda$, the resulting maximum unloaded gradient is $1.14E_0$ with a maximum electric field in silicon of $2.02E_0$, and an accelerating factor calculated to be 0.56. This accelerating factor is more than double the gradient of the quartz grating accelerators (AF=0.25), indicating that silicon buried gratings with thin-film coatings accelerate electrons more efficiently than quartz accelerators.

Figure 2A:
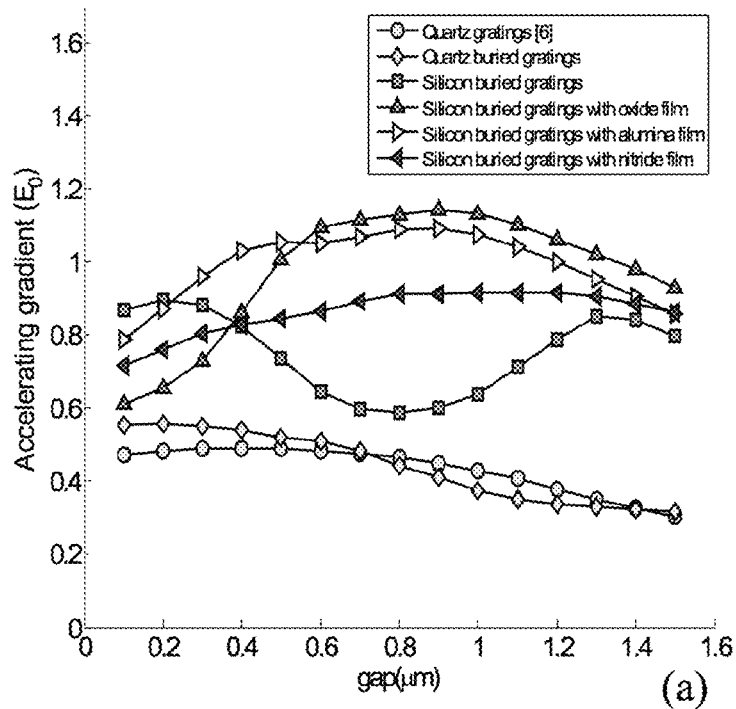
FIG. 2A is a graph of accelerating gradient as a function of the electron-channel gap, comparing embodiments of the invention with quartz grating type devices.

FIG. 2A shows the optimized accelerating gradient in units of $E_0$ as a function of the electron-channel gap for 2 μm laser illumination for the laser power-limited region, comparing embodiments of the invention with quartz grating type devices. The silicon buried grating accelerator offers two important features that represent improvements over the quartz accelerators: higher accelerating gradients and wider electron channels. For electron gaps larger than 1 μm, the accelerating gradients of the silicon buried gratings without thin film coatings are increased to above $0.6E_0$, and can be further boosted to above $1.1E_0$ with thin film coatings.

Figure 2B:
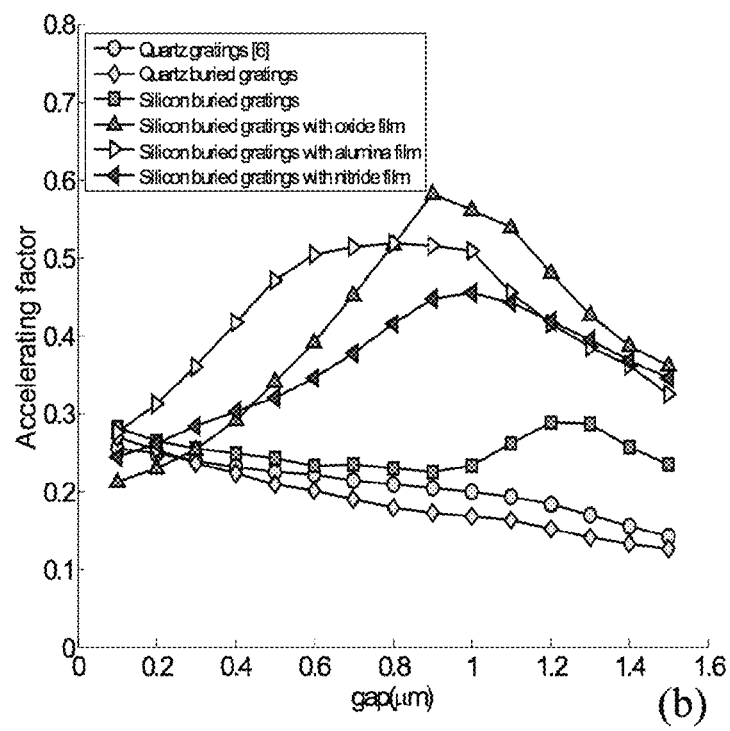
FIG. 2B is a graph of accelerating factor as a function of the electron-channel gap, comparing embodiments of the invention with quartz grating type devices.

The optimized accelerating factor for the material damage-limited region as a function of the electron-channel gap for 2 μm laser illumination is plotted in FIG. 2B. The accelerating factors of the silicon buried gratings are only slightly better than the quartz accelerators because of large standing wave ratios. The accelerating factors can be boosted to greater than 0.4 for thin-film coated silicon buried gratings with electron gaps larger than 1 μm. Wide electron channels that optimize the electron beams are crucial in most applications.

In these graphs, the quartz grating devices have $T_1$=1.75 μm, and no thin film coating. The quartz buried grating devices have $T_1$=1.7 μm, $T_2$=0.9 μm, and no thin film coating. The silicon buried grating devices have $T_1$=0.4 μm, $T_2$=0.3 μm, and no thin film coating. The silicon buried grating devices with an oxide coating have $T_1$=1.2 μm, $T_2$=0.8 μm, and a coating thickness of 190 nm. The silicon buried grating devices with an alumina coating have $T_1$=1.1 μm, $T_2$=1.1 μm and a coating thickness of 190 nm. The silicon buried grating devices with a nitride coating have $T_1$=1.3 μm, $T_2$=0.9 μm, and a coating thickness of 130 nm.

The accelerator performance (accelerating factor) along with the material (indices and damage fluence) and laser properties (power and pulse length) allow one to estimate practically reachable accelerator gradients in units of GV/m. Silicon buried gratings with a material damage fluence of 0.2 J/cm$^2$ yields a map of maximum accelerating gradient (in GV/m) as a function of accelerating factor and pulse length (in ps). The maximum accelerating gradient is proportional to the accelerating factor, and is inversely proportional to the square root of the pulse length. Gradients over 1 GV/m are achievable with short pulses and structures having large accelerating factors. With accelerating factors for the buried gratings ranging from 0.4 to 0.6, the maximum gradient varies from 0.4 GV/m to 1.1 GV/m when the pulse length changes from 1 ps to 100 fs. To achieve GV/m gradients and avoid material absorption, a thulium-doped mode-locked fiber laser at 2 μm could be used to illuminate the silicon buried gratings. In such a pulsed laser, it is desirable to have tunable pulse lengths from 100 fs to 1 ps, repetition rates of tens MHz, and pulse energy larger than 1 μJ per pulse.

Owing to larger accelerating factors, silicon buried gratings accelerate the electrons more efficiently than quartz gratings. However, the lower material damage threshold in silicon limits the achievable accelerating gradients. In the laser power-limited region with the maximum laser fluence lower than 0.2 J/cm$^2$, the silicon buried gratings can provide 1.6 times more accelerating gradient than the quartz gratings for a fixed laser fluence. To achieve the same accelerating gradient, the laser fluence need to be 2.5 times higher in the quartz structures than in the silicon buried gratings. Alternatively, in a material damage-limited region where the input laser fluence exceeds 0.5 J/cm$^2$, the quartz structure can produce a larger accelerating gradient than the silicon buried gratings.

In conclusion, embodiments of the present invention provide efficient silicon buried-grating electron accelerators. The silicon buried grating offers two important features that represent improvements over quartz grating accelerators: high accelerating gradients and wide electron channels. The silicon buried grating can provide high accelerating gradients for electron gaps larger than 1 μm, and it only requires 40% of the input laser fluence to achieve the same accelerating gradient. A maximum gradient of 1.1 GV/m can be achieved with a 100 fs pulse length and a 0.2 J/cm$^2$ laser fluence. The capability to achieve a GV/m gradient allows miniaturization of linear accelerators and enables realization of table-top free electron lasers. The fabrication processes of the silicon buried gratings can leverage well-developed CMOS and MEMS technologies, which not only eliminate the need for the complicated processes such as wafer bonding, but also provide the capability of integrating the accelerators with other electronic and photonic devices in standard silicon wafers.

Figure 3A:
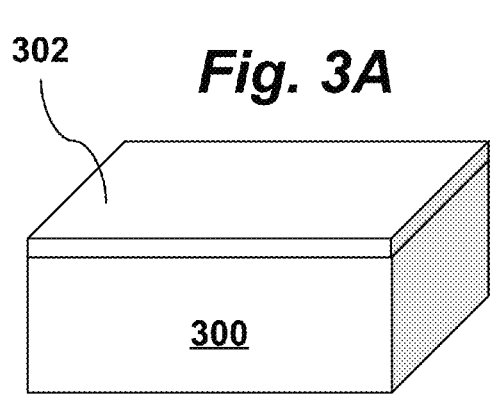
FIGS. 3A-3F are schematic diagrams illustrating steps of a process flow for fabrication of a silicon buried grating accelerator device according to an embodiment of the invention.

According to one embodiment, silicon buried grating accelerators may be fabricated by a MEMS process that includes deep reactive ion etch (DRIE). Schematics of the process flow for the silicon buried gratings are shown in FIGS. 3A-3F. This process includes patterning of the grating accelerators and rectangles for laser illumination surfaces. Starting with a bare silicon wafer 300, a thick thermal oxide layer 302 is grown by thermal oxidation to form a hard mask for the grating structures, as shown in FIG. 3A.

Figure 3B:
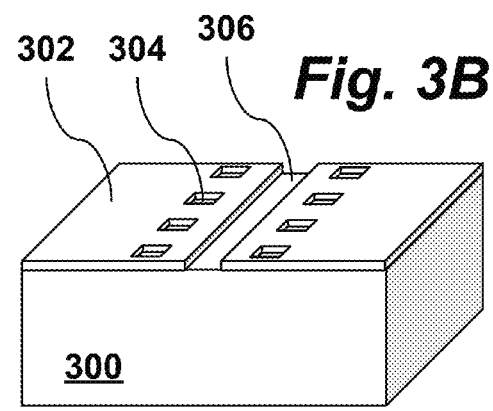

Next, a coating of photoresist is applied, and the wafer is patterned by optical lithography using a 5× reduction ASM-L i-line stepper, and the grating 304 and channel 306 patterns are transferred to the oxide hard mask 302 by anisotropic directional oxide etch, as shown in FIG. 3B.

Figure 3C:
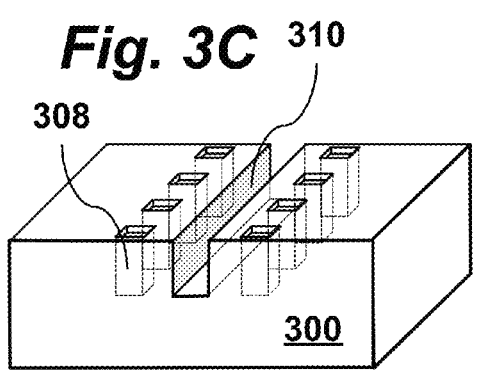
Figure 3D:
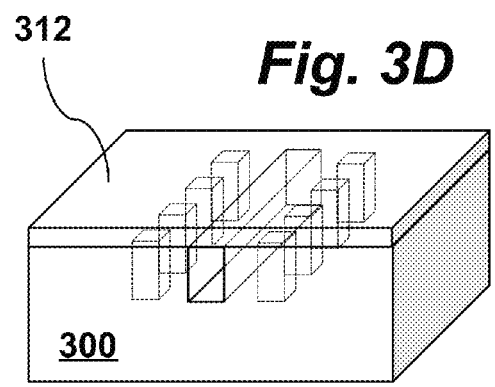

With the oxide hard mask, the grating 308 and channel 310 structures are then created by a deep directional etch into the silicon 300 in a DRIE machine, as shown in FIG. 3C. After etching the grating and channel structures, another thick oxide layer 312 is deposited by LPCVD low temperature oxide deposition to protect the grating and channel structures, as shown in FIG. 3D.

Figure 3E:
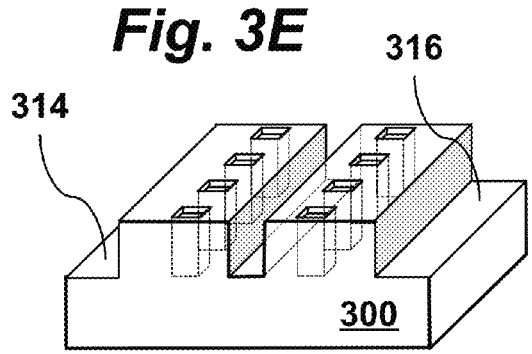
Figure 3F:
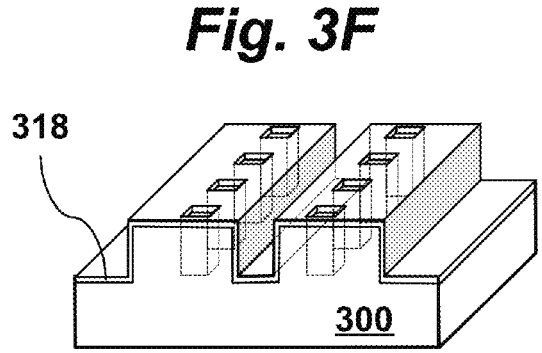

A second lithography is used to transfer laser illumination rectangles 314, 316 into the oxide hard mask. The rectangular structures are then created by etching directionally into silicon in the DRIE machine. The oxide hard mask is removed in 6:1 BOE, and the wafers were hydrogen annealed at high temperatures for several minutes to smooth the sidewalls, reducing scattering loss of the laser beam due to scallops created during the previous DRIE step. The resulting structure is shown in FIG. 3E.

Finally, the wafers are thermally oxidized to grow an oxide layer 318. Layer 318 could alternatively be a thin film deposition composed of another material, or multiple thin film layers. Multiple films serve the same purpose as single films, but having several films allows more freedom and flexibility to optimize the effect of the films. The presence of these thin film coatings offers two advantages. First, it can adjust the duty cycle of the gratings, thus improving the electric fields at the edge of the unit cell for optimal accelerating gradient. Second, since the tradeoffs between the fields in the channel and the maximum field in the material depend on reflectivity, the thin film can control the reflectivity to optimize the accelerating factor. Different thin film materials and thicknesses are designed and simulated so that the accelerating factor is optimized.

The invention claimed is:

1. A monolithic laser-driven dielectric electron accelerator on a chip comprising a dielectric photonic crystal accelerator structure having an electron beam channel etched into the chip, a buried grating composed of grating elements etched into the chip on both sides of the beam channel, and laser illumination rectangles etched in the chip on both sides of the beam channel, wherein the grating elements are arranged linearly parallel to the electron beam channel.

2. The accelerator of claim 1 wherein the buried grating has a periodic structure.

3. The accelerator of claim 1 wherein the buried grating has an asymmetric or random structure.

4. The accelerator of claim 1 wherein the buried grating has elements with linear dimensions between $0.1\lambda$ and $\lambda$, where $\lambda$ is an operational wavelength of incident laser light.

5. The accelerator of claim 1 wherein the buried grating is positioned at a distance between $0.1\lambda$ and $\lambda$ from the electron beam channel, where $\lambda$ is an operational wavelength of incident laser light.

6. The accelerator of claim 1 wherein the electron beam channel has smooth and continuous sidewalls.

7. The accelerator of claim 1 wherein the electron beam channel has textured sidewalls.

8. The accelerator of claim 1 wherein the electron beam channel has a width between $0.05\lambda$ and $2\lambda$, where $\lambda$ is an operational wavelength of incident laser light.

9. The accelerator of claim 1 wherein the electron beam channel has a depth between $0.05\lambda$ and 500 µm, where $\lambda$ is an operational wavelength of incident laser light.

10. The accelerator of claim 1 further comprising a thin film material coating of the electron beam channel and grating elements, having an index of refraction between 1 and 2.

11. The accelerator of claim 1 further comprising a thin film material coating of the electron beam channel and grating elements, composed of silicon dioxide, alumina, or silicon nitride.

12. The accelerator of claim 1 further comprising a combination of multiple distinct thin film material coatings of the electron beam channel and grating elements.

13. The accelerator of claim 1 wherein the accelerator structure is composed of silicon, silicon dioxide, silicon nitride, or silicon carbide.

* * * * *